United States Patent
Carnes, III et al.

(10) Patent No.: US 11,924,087 B2
(45) Date of Patent: Mar. 5, 2024

(54) ADJUSTABLE MULTI-CRITERIA NETWORK PATH COMPUTATION AND VISUALIZATIONS THEREOF

(71) Applicant: Ciena Corporation, Hanover, MD (US)

(72) Inventors: James P'ford't Carnes, III, Baltimore, MD (US); David Jordan Krauss, Centreville, VA (US)

(73) Assignee: Ciena Corporation, Hanover, MD (US)

( * ) Notice: Subject to any disclaimer, the term of this patent is extended or adjusted under 35 U.S.C. 154(b) by 26 days.

(21) Appl. No.: 17/126,130

(22) Filed: Dec. 18, 2020

(65) Prior Publication Data
US 2022/0200894 A1 Jun. 23, 2022

(51) Int. Cl.
*H04L 45/00* (2022.01)
*G06F 9/451* (2018.01)
*H04L 43/0864* (2022.01)
*H04L 43/087* (2022.01)
*H04L 43/0888* (2022.01)
(Continued)

(52) U.S. Cl.
CPC .............. *H04L 45/22* (2013.01); *G06F 9/451* (2018.02); *H04L 43/0864* (2013.01); *H04L 43/087* (2013.01); *H04L 43/0888* (2013.01); *H04L 45/123* (2013.01); *H04L 45/24* (2013.01)

(58) Field of Classification Search
CPC . G06F 9/451; H04L 41/0866; H04L 41/0869; H04L 41/0873; H04L 41/0876; H04L 41/0879; H04L 43/0864; H04L 41/22; H04L 43/087; H04L 43/0888; H04L 45/123; H04L 45/22; H04L 45/24
See application file for complete search history.

(56) References Cited

U.S. PATENT DOCUMENTS 6,266,704 B1 * 7/2001 Reed ................... H04L 63/0414
713/153
7,668,959 B2 * 2/2010 Okajima ................ H04L 41/12
709/227

(Continued)

OTHER PUBLICATIONS

Glowscript.org. "Widgets: button, radio, checkbox, slider, menu, winput, wtext", VPython Help, publicly posted Feb. 2, 2019, 5 pages. (Year: 2019).*

(Continued)

*Primary Examiner* — George C Neurauter, Jr.
(74) *Attorney, Agent, or Firm* — Baratta Law PLLC; Lawrence A. Baratta, Jr.

(57) ABSTRACT

Systems and methods include receiving a request for a path in a network including a plurality of network elements interconnected to one another via links, wherein the request includes values for a plurality of criteria, wherein the plurality of criteria include one or more of trust, privacy, and secrecy; utilizing a multi-criteria path selection process to determine the path through the plurality of network elements over the links based on the plurality of criteria and the associated values; and providing a display of the determined path in a network map. The trust quantifies trustworthiness of each link in the network and the values of trust are any of a rating and a selection for inclusion or exclusion, the privacy quantifies a number of the links the network path is routed over for network obfuscation, and the secrecy quantifies a level of encryption utilized on the links.

18 Claims, 7 Drawing Sheets

(51) Int. Cl.
*H04L 45/12* (2022.01)
*H04L 45/24* (2022.01)

(56) References Cited

U.S. PATENT DOCUMENTS

| | | | | |
|---|---|---|---|---|
| 7,710,894 | B2* | 5/2010 | Karstens | H04L 41/022 370/465 |
| 8,284,758 | B2* | 10/2012 | Shah | H04L 45/02 370/401 |
| 8,565,075 | B2* | 10/2013 | Russell | H04L 45/22 370/228 |
| 9,288,143 | B2* | 3/2016 | Stuart | H04L 47/2475 |
| 9,426,056 | B2* | 8/2016 | Russell | H04L 45/22 |
| 9,503,443 | B2 | 11/2016 | Krauss et al. | |
| 9,602,387 | B2* | 3/2017 | Wood | H04L 41/0816 |
| 9,665,271 | B2* | 5/2017 | Chi | G06T 11/206 |
| 9,671,943 | B2* | 6/2017 | Van der Velden | G06F 3/04847 |
| 9,755,946 | B2* | 9/2017 | Farris | H04L 45/02 |
| 9,769,031 | B2* | 9/2017 | Priya | H04L 41/0879 |
| 10,148,727 | B2* | 12/2018 | Scharber | H04L 41/5054 |
| 10,210,347 | B2* | 2/2019 | McCorkendale | H04L 63/0421 |
| 10,367,726 | B1* | 7/2019 | Lokman | H04L 63/108 |
| 10,439,956 | B1* | 10/2019 | Salour | H04L 47/70 |
| 10,455,632 | B2* | 10/2019 | Baron | H04W 48/16 |
| 10,678,414 | B2* | 6/2020 | Chi | G06F 3/04883 |
| 10,693,743 | B2* | 6/2020 | Zhong | G06F 16/444 |
| 10,700,958 | B2* | 6/2020 | Flamini | H04L 45/124 |
| 10,873,537 | B1* | 12/2020 | Salour | H04L 47/70 |
| 10,931,539 | B2* | 2/2021 | Hu | H04L 45/02 |
| 10,999,189 | B2* | 5/2021 | Musku | H04L 45/04 |
| 11,201,817 | B2* | 12/2021 | Aranha | H04L 45/302 |
| 11,252,034 | B1* | 2/2022 | Sidebottom | H04L 41/0826 |
| 2013/0242804 | A1* | 9/2013 | Yabusaki | H04L 41/0893 370/255 |
| 2016/0019086 | A1* | 1/2016 | Lee | G06F 9/45558 718/1 |
| 2017/0019335 | A1* | 1/2017 | Schultz | H04L 45/64 |
| 2018/0062943 | A1 | 3/2018 | Djukic et al. | |
| 2018/0069786 | A1* | 3/2018 | Lokman | H04L 63/1475 |
| 2018/0375744 | A1* | 12/2018 | Mayya | H04L 45/70 |
| 2019/0081930 | A1* | 3/2019 | Hunt, IV | H04L 12/4641 |
| 2019/0230046 | A1 | 7/2019 | Djukic et al. | |
| 2020/0067935 | A1 | 2/2020 | Carnes, III et al. | |
| 2020/0162371 | A1* | 5/2020 | Musku | H04L 45/54 |
| 2020/0162511 | A1 | 5/2020 | Krauss et al. | |
| 2020/0322391 | A1* | 10/2020 | Filsfils | H04L 63/205 |
| 2021/0099434 | A1* | 4/2021 | Toyserkani | H04W 76/10 |
| 2022/0006697 | A1* | 1/2022 | Hill | H04L 41/22 |
| 2022/0078164 | A1* | 3/2022 | Hunt, IV | H04L 45/22 |

OTHER PUBLICATIONS readthedocs.io. "Widget List", Jupyter Widgets 7.5.1 Documentation, publicly posted Jan. 4, 2020, 12 pages. (Year: 2020).*

* cited by examiner

ADJUSTABLE MULTI-CRITERIA NETWORK PATH COMPUTATION AND VISUALIZATIONS THEREOF

FIELD OF THE DISCLOSURE

The present disclosure generally relates to networking. More particularly, the present disclosure relates to systems and methods for adjustable multi-criteria network path computation and visualizations thereof.

BACKGROUND OF THE DISCLOSURE

Path computation in a network involves finding a suitable route for data between a source (ingress) and destination (egress) subject to constraints, policy, costs, weights, etc. The general approach for path computation is to use graph theory where each network node or network element is a vertex, and each link connecting the nodes are edges. With this abstraction, the path computation process becomes a graph problem. This works in digital networks (packet, Time Division Multiplexed (TDM), Multiprotocol Label Switching (MPLS), Internet Protocol (IP), etc.) and optical networks. Path computation algorithms generally involve one variable that is meant to be minimized (or maximized). For instance, shortest path algorithms that run on a network graph aim to minimize the total sum of links traversed from one point in the network to another. The links' values are assigned by a routing protocol, such as Open Shortest Path First (OSPF), and could correspond to latency across the link. Therefore, the shortest path minimizes the latency.

Determining how traffic flows through a network is usually the job of an Interior Gateway Protocol (IGP). Two popular examples of IGPs are OSPF and Intermediate System-Intermediate System (IS-IS). For each of these protocols, one weight is assigned to each link that ultimately forms a network graph. A popular choice for that weight could be the propagation delay, or latency, across the link. Each node of the network then builds a graph of the network based on the nodes and link weights. The routing decision for the next hop is then made by running a shortest path algorithm (such as Dijkstra's Shortest Path First (SPF)) on the graph. One drawback of this technique is that only one parameter, the weight of the link, can be minimized (or maximized, for instance, if the parameter were available bandwidth) at a time. There is the ability to prune the graph before the SPF algorithm is run, which can be referred to as a Constrained Shortest Path First (CSPF) algorithm (and this can be implemented using link affinities, link coloring, or IGP Flexible Algorithm (Flex Algo)). However, the application of a CSPF algorithm is serial or stepwise; that is, first, the graph is pruned according to the CSPF parameters, then the single variable SPF algorithm is performed. The k shortest path routing problem is a generalization of the shortest path routing problem in a given network. It asks not only about a shortest path but also about the next k−1 shortest paths (which may be longer than the shortest path), k is an integer greater than 1. Regardless, each of the k shortest paths through the network is still only the shortest path based on one variable.

Currently, there is no way to specify that path selection is based on more than one criterion. In addition, there is no way in router networks to specify a range of values to be considered. Finally, there is no known approach that lets an operator specify the path selection criteria using a Graphical User Interface (GUI) interface or that then displays the network or path through the network as a result of the path selection criteria.

BRIEF SUMMARY OF THE DISCLOSURE

The present disclosure relates to systems and methods for adjustable multi-criteria network path computation and visualizations thereof. The present disclosure includes a path computation approach that simultaneously and iteratively minimizes (or maximizes) multiple criteria and does so through an easily adjustable user interface. The user interface allows a network operator to select a range of values/parameters for multiple path choice criteria, which become weights for the overall selection function. Furthermore, the path of choice and available paths can then be visualized and shown to the operator. The user interface can include an intuitive slide bar interface to select multiple criteria. Also, the multiple criteria can include unique criteria, including trust, privacy, security, cost (in currency), etc. The selection of each of the criteria can be either a range of values, a threshold, or a yes/no, and the user interface can dynamically display a network graph/map based on the selections for visualization. Further, the multi-criteria network path computation is extensible, namely, new criteria can be added as well as providing relative weighting between criteria.

In an embodiment, a method includes steps, a processing device includes a processor configured to implement the steps, and a non-transitory computer-readable medium includes instructions for programming a processing device to perform the steps. The steps include receiving a request for a path in a network including a plurality of network elements interconnected to one another via links, wherein the request includes values for a plurality of criteria, wherein the plurality of criteria include one or more of trust, privacy, and secrecy; utilizing a multi-criteria path selection process to determine the path through the plurality of network elements over the links based on the plurality of criteria and the associated values; and providing a display of the determined path in a network map.

The trust quantifies trustworthiness of each link in the network and the values of trust are any of a rating and a selection for inclusion or exclusion. The selection for inclusion or exclusion can include any of manufacturer of the network elements associated with each link in the network, country where the network elements are located in, and network operator of the network elements. The privacy quantifies a number of the links the network path is routed over for network obfuscation. The secrecy quantifies a level of encryption utilized on the links. The level of encryption utilized on the links can be quantified as a value between an unencrypted link up to a hardware encrypted link.

The steps can further include providing a user interface that includes a plurality of slide bars for selection of any of the plurality of criteria, wherein the plurality of slide bars each include either a range or a threshold for the corresponding values. The user interface can further include one or more check boxes for including or excluding the values from one or more of the plurality of criteria. The steps can further include updating the network map to visually change any links in the network based on selections in the user interface, wherein non-compliant links are visually distinguished from compliant links based on the selections. The plurality of criteria can further include any of latency, capacity, cost, jitter, and loss. The plurality of criteria can further include cost that equates to a value to operate and/or a value of equipment. The steps can further include adding a new criterion to the plurality of criteria for use in the multi-criteria path selection process. The associated values can be one of assigned in advance, computed, and based on measurements in the network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for adjustable multi-criteria network path computation and visualizations thereof. The present disclosure includes a path computation approach that simultaneously and iteratively minimizes (or maximizes) multiple criteria and does so through an easily adjustable user interface. The user interface allows a network operator to select a range of values/parameters for multiple path choice criteria, which become weights for the overall selection function. Furthermore, the path of choice and available paths can then be visualized and shown to the operator. The user interface can include an intuitive slide bar interface to select multiple criteria. Also, the multiple criteria can include unique criteria, including trust, privacy, security, cost (in currency), etc. The selection of each of the criteria can be either a range of values, a threshold, or a yes/no, and the user interface can dynamically display a network graph/map based on the selections for visualization. Further, the multi-criteria network path computation is extensible, namely, new criteria can be added as well as providing relative weighting between criteria.

Example Network

Figure 1:
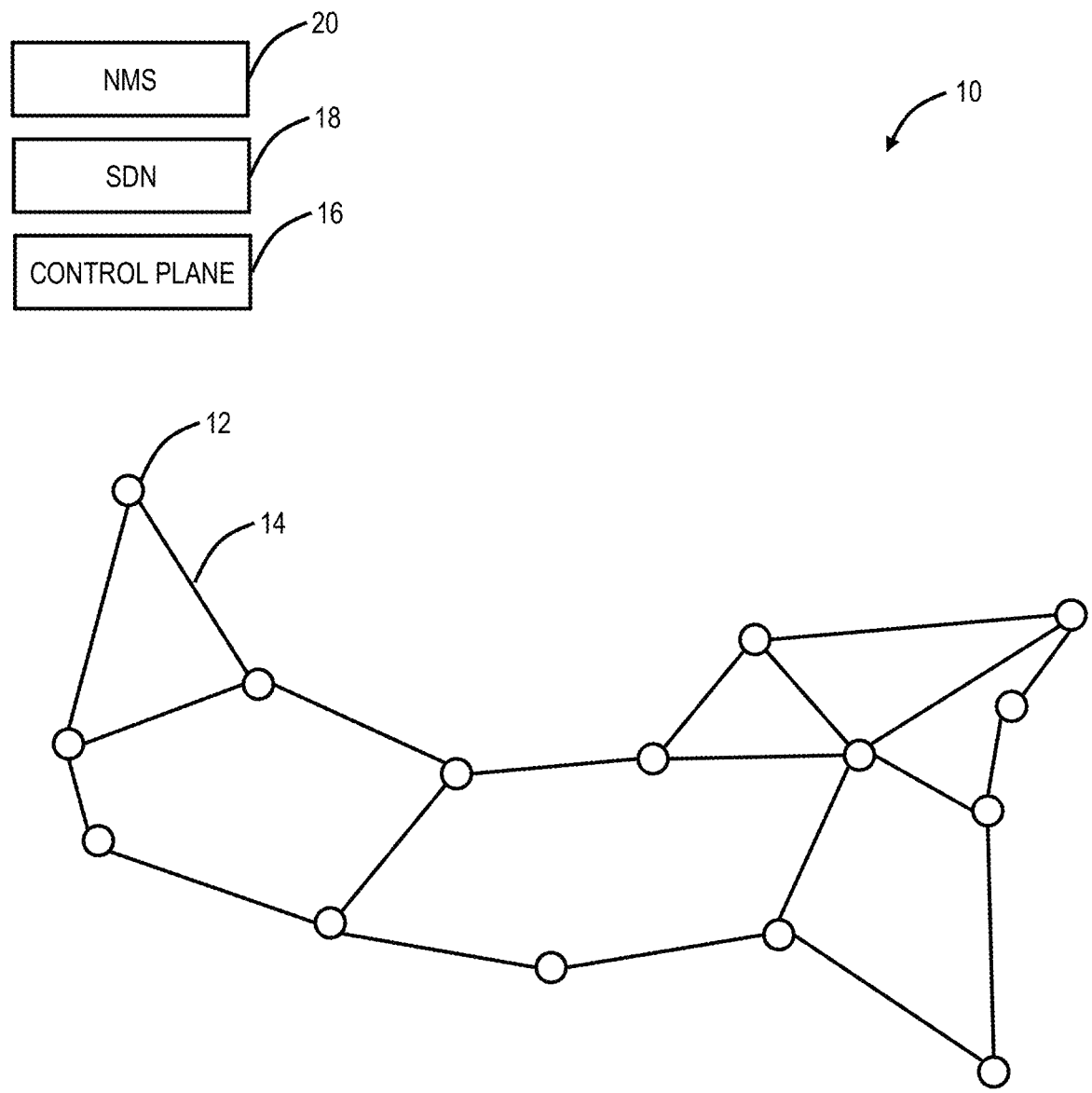
FIG. 1 is a network diagram of a network that is represented by a graph where nodes represent network elements in the network and links (edges) represent connections between the nodes.

FIG. 1 is a network diagram of a network 10 that is represented by a graph where nodes 12 represent network elements in the network 10 and links 14 (edges) represent connections between the nodes 12. The network elements can include Wavelength Division Multiplexing (WDM) terminals, Reconfigurable Add/Drop Multiplexers (ROADMs), Packet-Optical Transport Systems (POTS), optical switches, packet switches, routers (e.g., edge, core, etc.), Provider Edge (PE) routers, Label Switch Routers (LSRs), Label Edge Routers (LERs), wireless terminals, and the like. The links 14 are a logical view of data connectivity and typically involve optical fiber cables. The connections or traffic on the links 14 can be wavelengths (Layer 0), Time Division Multiplexed (TDM) (Layer 1) (e.g., OTN/SONET/SDH), packet (Layer 2) (e.g., Ethernet, Multilayer Protocol Switching (MPLS), Virtual Local Area Network (VLAN), etc.), Internet Protocol (IP) (Layer 3), and the like as well as combinations thereof.

The network 10 can include a control plane 16, a Software-Defined Networking (SDN) controller 18, and/or a Network Management System (NMS) 20. The control plane 16 can operate on and/or between the network elements. The control plane 16 includes software, processes, algorithms, etc. that control configurable features of the network 10, such as automating the discovery of the nodes 12, the capacity of the links 14, bandwidth availability on the nodes 12, connectivity between the nodes 12; dissemination of topology and bandwidth information between the nodes 12; calculation and creation of paths for connections; network-level protection and restoration; and the like. In an embodiment, the control plane 16 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 10, and the control plane 16 can utilize any type of control plane for controlling the nodes 12 and establishing connections therebetween. Examples of connections for the control plane 16 can include Subnetwork Connections (SNCs), Label Switched Paths (LSPs), etc. A path (e.g., SNC, LSP, etc.) is considered valid for connection setup based on the availability of the nodes 12, the links 14, and sufficient bandwidth available thereon, in addition to the various aspects described herein with respect to the multiple criteria.

The network 10 can also include the SDN controller 18. In an embodiment, the SDN controller 18, the control plane 16, and the NMS 20 can work together. In another embodiment, the SDN controller 18 can operate independently with or without the control plane 16. In a further embodiment, the SDN controller 18 may be omitted. SDN allows the management of network services through the abstraction of lower-level functionality. This is done by decoupling the system that makes decisions about where traffic is sent (SDN control through the SDN controller 18) from the underlying systems that forward traffic to the selected destination (i.e., the physical equipment in the network 10). Work on SDN calls for the ability to centrally program provisioning of forwarding on the network 10 for more flexible and precise control over network resources to support new services. The SDN controller 18 is a processing device that has a global view of the network 10. Additionally, the SDN controller 18 can include or connect to SDN applications that can utilize the data from the SDN controller 18 for various purposes. In an embodiment, the SDN applications include path computation systems and methods that are described in detail herein.

The NMS 20 is a management system configured to interface the network elements for Operations, Administration, Maintenance, and Provisioning (OAM&P) functions. Specifically, the present disclosure provides path computation systems and methods. Those skilled in the art will recognize these can be implemented at any of the control plane 16, the SDN controller 18, the NMS 20, as well as in-skin (locally on a network element).

Path Computation Via Multiple Criteria

A typical approach to path computation involves using a routing graph to represent the network 10, as illustrated in FIG. 1. As is well-known in the art, a routing graph includes vertices (nodes) that represent network elements and edges (links) that represent connectivity between the vertices (e.g., the links 14). This modeling is convenient because once the network 10 is modeled in the routing graph, a path can be determined using various algorithms known in the art.

The present disclosure includes the use of an algorithm that minimizes (or maximizes) a path computation function and simultaneously takes into account multiple criteria. The relative weight that each criterion exerts on the overall algorithm can be determined by a graphical "slider bar" that is set by a user. The outcome of the algorithm may then be represented by a visual depiction of the network where, based on the criteria, some links may no longer be candidates as options for the path where traffic may flow. Example criteria could include latency, capacity, trust, privacy, confidentiality (security), cost (in currency), and reliability features, including packet loss, packet jitter, and link utilization.

Each link in the network will be assigned a value for each of these parameters (either by static assignment or by dynamic measurement), and each one of these criteria will correspond to a weight in an algorithm that seeks to select the best path (or k best paths, k>1) (either by minimization or maximization) through the network. In mathematical terms, this can also be thought of as a multivariable optimization problem, where local minima, local maxima and saddle points are calculated. The present disclosure contemplates any approach to multivariable optimization based on the various criteria described herein and the visualizations. The multivariable optimization includes a multi-criteria path selection algorithm that attempts to find the local and/or global minimum or maximum of a function defined by more than one variable. For instance, the algorithm could be programmed to maximize the fit of the network by using links with the most amount of bandwidth, but then at the same time be working to maximize the privacy and secrecy of a path across those least utilized links or any other criteria.

Of note, this is different than the way routing protocols currently work. For example, OSPF, Resource Reservation Protocol-Traffic Engineering (RSVP-TE), or k-shortest path algorithms work by computing the shortest path through a network graph based on one variable. It is possible to use other criteria to prune the graph before the SPF algorithm is run (i.e., CSPF.) However, CSPF merely prunes the network graph, it does not perform a more general minimization/maximization function across multiple variables. In the example of OSPF, this protocol will produce the shortest path for link weights, and a CSPF would do the same for a pruned version of the same graph. RSVP-TE works in a very similar manner, it will only consider links that have sufficient bandwidth for a given reservation (thus, links without sufficient bandwidth are pruned), and then the shortest path is determined. In the case of k-shortest path, an ordered list of paths is determined based on one criterion. A second criterion can then be used to select which of the k paths to choose. This is no different than a stepwise approach to generating shortest path candidates and then applying one more criterion to that limited (pruned) set. It does not attempt to find a global minimum or maximum for the combined multivariable function.

Multiple Criteria

The following describes some examples of the criterion for the multi-criteria path selection algorithm. Each criterion will have well-defined quantitative levels associated with it. The criteria can include, without limitation, latency, capacity, cost, trust, privacy, secrecy, jitter, loss, etc.

Latency is the time delay on a path. For example, latency can be measured in a range of values in milliseconds, possibly 0-1000 ms. Latency occurs based on delays in each network element as well as propagation delay over the optical fiber. Real-time applications, such as financial, may require low latency.

Capacity is the available bandwidth on a link 14, and can be expressed as a value, percentage, etc. For example, percentage can be 0 (empty) to 100% (full).

Cost includes a value related to the operating expense and/or capital expense of a link. For example, the cost can be expressed as a number such as a dollar value of the cost of the link and/or to operate the link.

Latency, capacity, and cost can be applied to any layer connection, i.e., Layer 0 (optical), Layer 1 (TDM), Layer 2 (packet), Layer 3 (IP), etc.

Jitter and loss are so-called reliability thresholds that can be applied to packet networks. Jitter and loss can be defined based on Layer 2 Operations, Administration, and Maintenance (OAM) via Connectivity Frame Management (CFM) packets that are used to measure jitter, loss, etc.

The present disclosure includes three new criteria referred to herein as trust, privacy, and secrecy. Trust relates to how trustworthy a path is, namely, trust attributes are characteristics such as pre-approved links, vetted links, manufacturer of the network elements, country where the network elements are located in, network operator of the network elements, etc. In an embodiment, trust can include a matrix and/or rating system, such as a scale of 1-10, where each attribute has a value, and the combination of attributes results in an overall trust rating. In another embodiment, trust can be a true/false or yes/no of various selections. For example, one may want a path that excludes a certain manufacturer, that excludes certain countries, that excludes certain network operators, etc. Alternatively, one may want a path that only utilizes certain network operators, etc.

The values for determining trust can be obtained as follows. For the manufacturer, the value can typically be determined based on the Media Access Control (MAC) address of components in the network element, as is known in the art. The country or geographic location can be determined from an IP address geolocation as is known in the art. The network operation can be determined from the IP address as well or via other means such as information provided by the network element.

Privacy relates to the concept of network obfuscation. In this case, the value for privacy is related to the number of additional nodes the flow is routed through. For example, a value of 0 for privacy would be the direct, shortest path. However, a value of 5 would result in the flow being routed through 5 additional nodes. This is similar to the concept of TOR (The Onion Router) routing, which increases hops to obfuscate traffic. Also, increasing the number of nodes is counterintuitive in terms of path computation. Typically, the objective is the shortest path first. However, to increase privacy, there may be a desire to increase the number of hops. In an embodiment, the privacy can be a value of a number of hops, including either a minimum or maximum and/or a range of values. In another embodiment, privacy may also include directionality such as similar to trust and country. Here, an operator can select directions of flows, such as to avoid locations as well as go out of the way.

Secrecy is related to the relative level of encryption used on the link 14. This criterion may require a matrix and rating system as well, but generally speaking, there are different types of encryption that the industry considers to have different degrees of strength. For instance, an encrypted tunnel through a network can be an element of a Virtual Private Network (VPN), but it is generally the least strong among encryption options (although this itself could vary depending on the actual type and bit-length of that encryption algorithm.) Tunnels using hardware encryption generally are considered stronger, and then the type of encryption implemented on that hardware determines what applications can use it. Also, the protocols on the links 14 can include encryption such as OTNSec, MAC Sec, etc. For instance, a corporate VPN could use AES 256-bit encryption, whereas military or intelligence applications would require NSA-approved Type I or Type II encryption. In between is the concept of "commercial solutions for classified systems" (CSFC.) Therefore, simple software VPN tunneling would have a low value (1-2), VPN hardware encryption a higher value (4-5), CSFS even higher (7-8), and then Type I and Type II encryption at the highest level (9-10.) It is also possible to have the encryption being a selection, namely only use links that have the selected type of encryption.

The algorithm proposed here will be extensible as well. That is, any new criteria that have yet to be thought of can be easily added to the algorithm. Once again, the relative weight of those new criteria in the overall path selection algorithm can be specified by graphical slide bars as described herein.

For Layer 1 and Layer 2 networks, some criteria values need to be assigned a priori, such as via the NMS 20. Examples of assigned data might be geographic location, trust level, or dollar cost. Also, other values can be computed, such as dollar cost. Other criteria values can be assigned to links 14 by measuring and collecting performance data. This can be done at Layer 1 via loss and latency measurements, at Layer 2 such as via G.8013/Y.1731 (08/15) performance measurement techniques and at Layer 3 using network management tools.

Once measured and assigned, the multi-criteria system can then be used to determine the provisioned path of the network circuits. This applies equally to hierarchical transport links. For instance, values may be assigned to the underlying fiber, and the path of the provisioned OTN circuits would be determined by those values. The same would be true for Ethernet circuits, Layer 3 links/tunnels and VPNs. Therefore, each level of the hierarchy of transport methods can be controlled by its own set of adjustable levers.

For the security characteristics, including trust, privacy, and secrecy, the underlying measurable parameters will include configurable factors that the end-user could define. Trust, for example, may be configurable based on geographic or political trust of the infrastructure or the manufacturer of the proposed path. An unapproved vendor's equipment could be potentially routed around. For privacy, the slide bar 34 translates to the number of random nodes built into the route. As the demand for privacy increases the number of notes increases, further obfuscating the start and end of a flow. Secrecy will be determined by the availability and type of encryption available for the flow. A minimal setting on secrecy would accept unencrypted flows, as the slide bar 34 is moved toward maximum secrecy, the type of encryption required would be increased from MACSEC to IPSEC to OTN Encryption (as an example).

GUI

Figure 2:
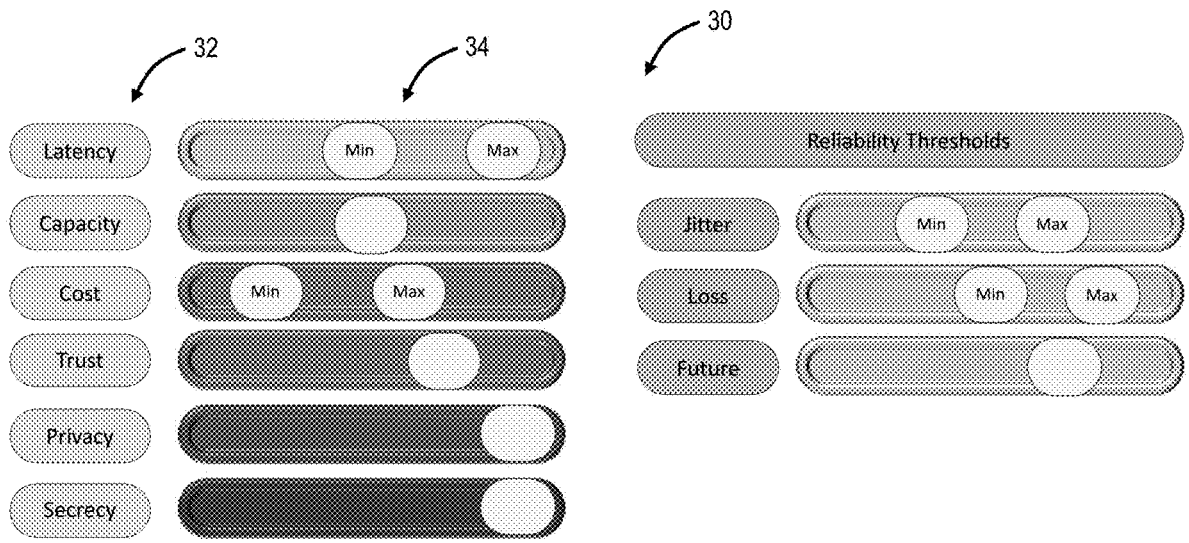
FIGS. 2-4 and 6 are screenshots of a Graphical User Interface (GUI) for selecting the multiple criteria in a multi-criteria path selection algorithm.
Figure 3:
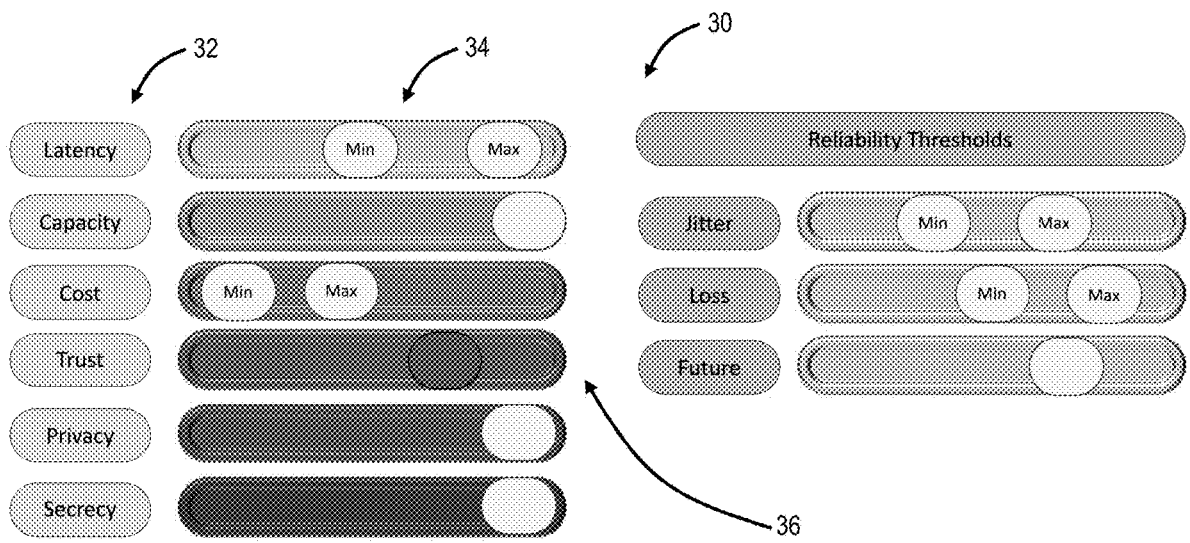

FIGS. 2 and 3 are screenshots of a Graphical User Interface (GUI) 30 for selecting the multiple criteria in a multi-criteria path selection algorithm. The GUI 30 may be provided via the control plane 16, the SDN controller 18, the NMS 20, a PCE, etc. The objective of the GUI 30 is to provide an efficient mechanism for selecting the criteria for a path in the network 10. To that end, the GUI 30 can include labels 32 for selecting each criterion and a slide bar 34 for selecting values of the criteria. This allows a network operator to select a sliding scale of values for each criterion. Some criteria may have one selection lever, whereas other criteria may have two levers that allow the operator to define a range. For example, latency, cost, jitter, and loss can be specified as a range, i.e., min and max values. Further, capacity, trust, privacy, and security can be specified via a single value, i.e., a threshold.

The value that is selected via the lever serves to influence or weight that parameter's importance in the minimization/maximization function. As options are selected and moved, this may cause restrictions on other options. FIG. 2 illustrates all criteria, whereas FIG. 3 illustrates the (dollar) cost function range has been set very low, and, in this example, there are no links with any configurable trust levels available within the cost range, illustrated by a grayed-out trust bar 36. That is, as options are selected or changed, other options may be unavailable.

In another embodiment, the labels 32 can be selected to provide check box selections such as related to trust or secrecy. For example, only use these manufacturers or exclude others, only use network elements in these countries, etc.

Network Visualization

Once the slide bars 34 have been selected, the multi-criteria path selection algorithm can then determine the path through the network 10 that meets the policy. This can be displayed on a network map allowing the customer to visualize the flow path, such as illustrated in FIG. 1. This will not only help the customer visualize their data flow but potentially highlight areas of concern with respect to that flow. For example, a low latency network flow with maximum bandwidth is selected but the flow is established through a competitor's headquarters, there is a clear and visual problem with the supporting data.

Figure 4:
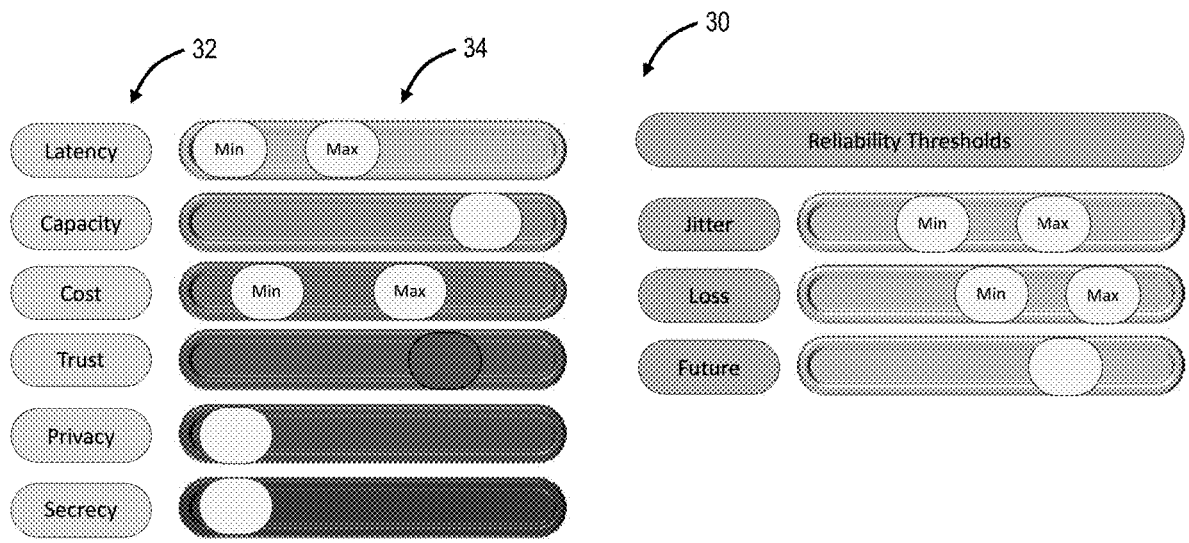
Figure 5:
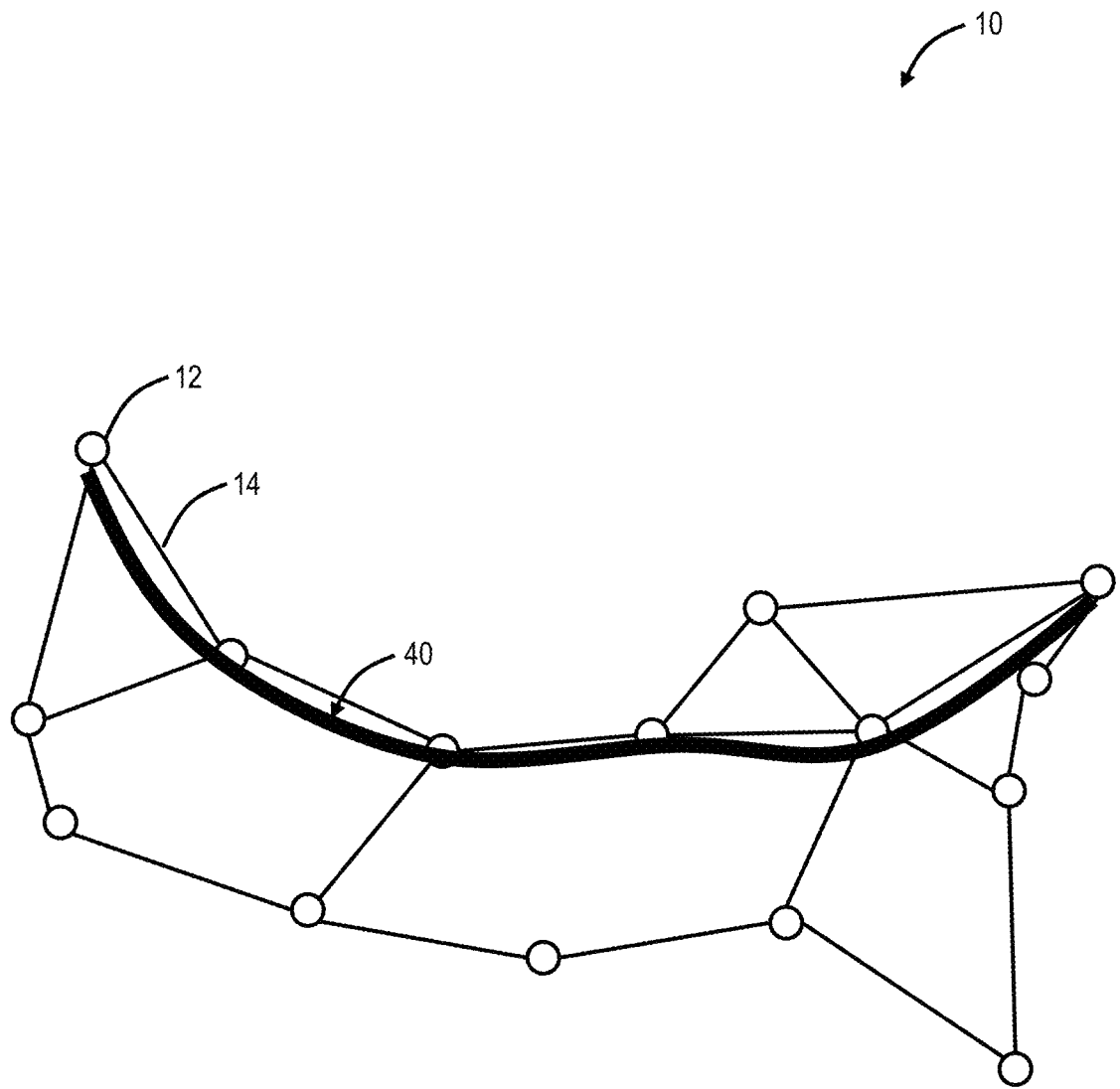
FIGS. 5 and 7 are network diagrams of the network of FIG. 1 with visualizations based on the settings in the GUI of FIGS. 4 and 6, respectively.

For example, assume FIG. 1 is the entire network 10 with all links 14. Each of the links 14 in the network 10 would have numbers assigned to them for each of the slide bar 34 characteristics. The GUI 30 can include the one illustrated in FIG. 4. The slide bar 34 settings in FIG. 4 translate to relatively low latency, somewhat low cost and little need for privacy. Trust is grayed out because the current settings cannot meet the selected trust level as it may be routing through unknown provider network nodes. As the slide bars 34 are moved, a flow through the network 10 can be displayed and it will be adjusted visually as the slide bars 34 are moved. Ultimately, a path 40 through the network 10 is determined to be as illustrated in FIG. 5.

Figure 6:
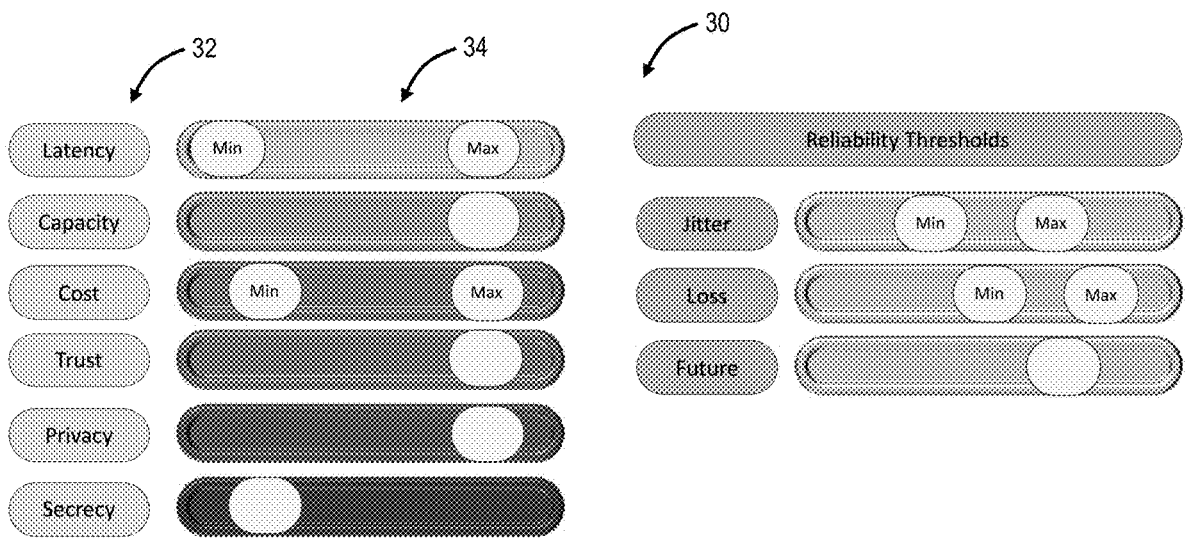
Figure 7:
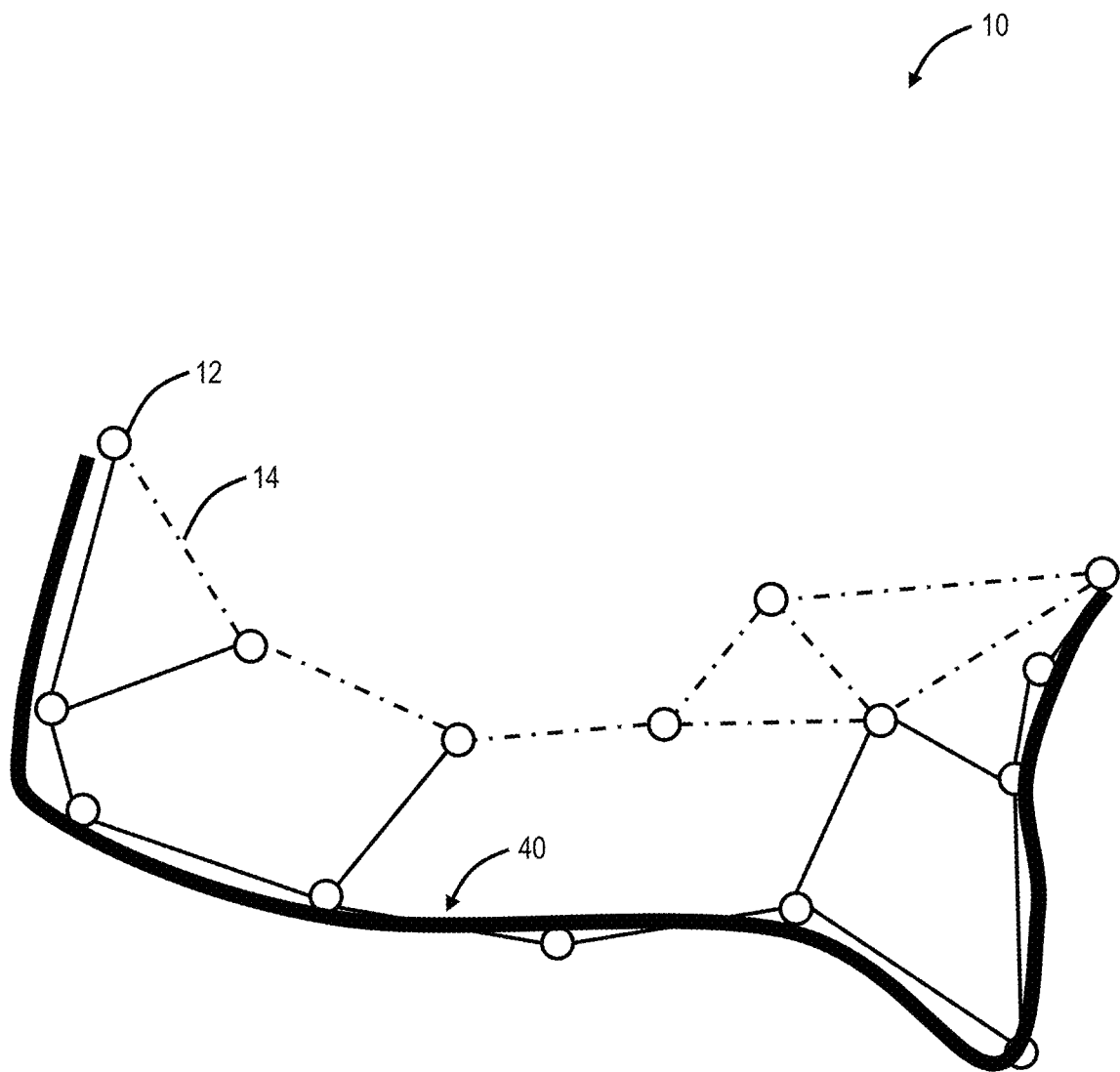

Now, assume the slide bars 34 are changed as illustrated in FIG. 6 to allow for more latency, higher cost but with increased privacy and high trust. When the slide bars 34 are moved to those settings, some links in the network are no longer available (they no longer meet the criteria), as is illustrated in FIG. 7 where unacceptable links 14 are visually differentiated (dashed in this example, but could be grayed out, different colors, omitted, etc.). Now the flow is forced to take a different path, which is displayed as well in FIG. 7.

Thus, the slide bars 34 in the GUI 30 can be displayed with a network map that can be dynamically updated visually based on the settings in the GUI 30.

Use Cases

The levers (slide bars 34) can be set to program several possible path selection intents with a single click. The following describes some example options.

Most Direct: calculate the most direct path through the network 10. The driver for this choice is the most direct path, utilizing the fewest network providers possible. It is important to note that the most direct path may not present the greatest bandwidth or lowest latency; the goal is simply the fewest connection points.

Highest Speed: calculate the path through the network using the highest possible bandwidth links 14. The driver for this choice is a virtual network that presents the highest possible data throughput between the two endpoints. It is important to note that this option may present greater bandwidth but may not establish a circuit conducive for low latency applications.

Lowest latency: calculate the path through the network with the lowest possible latency. The driver for this choice is a virtual network that presents the lowest latency throughput between the two endpoints. It is important to note that this option may present lower latency but may not establish a circuit conducive for high volume applications.

Most Trusted: calculate the path through the network that provides the greatest level of trusted infrastructure. The driver for this choice is a virtual network that builds a path over only pre-approved and vetted infrastructure. It is important to note that this option may build a network that is neither the fastest nor has the greatest throughput. The sole purpose of this option is to build a high trust network.

Privacy Enhanced: build a virtual network that attempts to ensure the greatest extent of privacy as possible. The circuit will route the flow between multiple network nodes to obfuscate the identity of the customer. This is akin to a TOR (The Onion Router) network over commercial networks.

Secret: Calculate a flow based on the level of encryption provided for the route. If encryption cannot be determined, it will be assumed to be unencrypted. The lower the level in the network, the more encryption is applied, the higher the trust. This will translate into the highest trust levels featuring OTN encryption.

Lowest cost: calculate the path through the network that provides the lowest cost. The driver for this choice is a network with multiple paths, and the operator would like to use the lowest dollar cost links.

Best Fit: calculate the path through the network that choices the maximum tolerable thresholds for the parameters defined. This would be used when wanting to allow the greatest amount of resources to remain in the network after the minimum amount of tolerances are adhered to. For instance, if a network or flow required no more than 50 ms of latency, then the provisioned path should be as close to 50 ms as possible without exceeding it. Considering that there may be paths that exist that at 40 ms and 10 ms, it would be better to choose the 40 ms in case a demand for 10 ms arrives in the future.

Combination: calculate the path through a network that adheres to a combination of parameters. An example would be the lowest latency possible, through the least utilized links, that are constrained to a trusted geographic boundary and must travel through private or encrypted links. As the individual characteristic bars 34 are moved other bars will begin to move or be made unavailable. The interface will allow the user to deselect a parameter from consideration if they do not want it to be considered in the calculation. The interface will also allow the user to lock one characteristic, while configuring the remaining options. For example, a user could lock trust at the highest level, ensuring it will not be moved and continue to see what other options are supported. Subsequent locks can be applied to get to a desired flow path.

Multi-Criteria Path Selection Process

Figure 8:
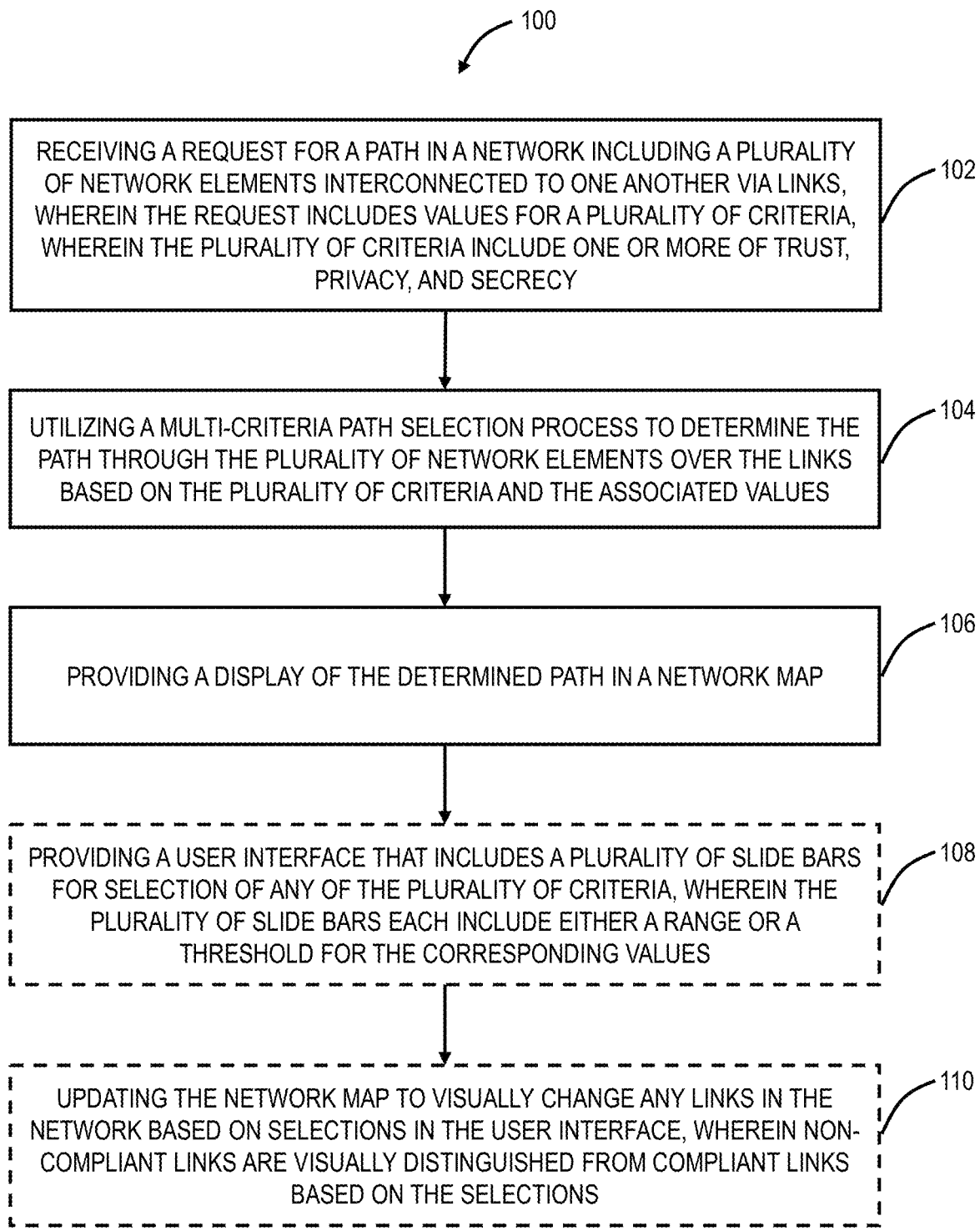
FIG. 8 is a flowchart of a multi-criteria path selection process.

FIG. 8 is a flowchart of a multi-criteria path selection process 100. The multi-criteria path selection process 100 can be a method with steps, embodied as instructions stored in a non-transitory computer-readable medium for programming a processing device to perform the steps, and implemented via a processing device executing the steps, e.g., a PCE, NMS, SDN controller, network planning tool, in-skin controller in a network element, etc.

The multi-criteria path selection process 100 includes receiving a request for a path in a network including a plurality of network elements interconnected to one another via links, wherein the request includes values for a plurality of criteria, wherein the plurality of criteria include one or more of trust, privacy, and secrecy (step 102); utilizing a multi-criteria path selection process to determine the path through the plurality of network elements over the links based on the plurality of criteria and the associated values (step 104); and providing a display of the determined path in a network map (step 106). That is, the multi-criteria path selection process 100 introduces use of at least one of trust, privacy, and secrecy in addition to other criteria such as bandwidth, cost, latency, etc.

Again, the trust quantifies trustworthiness of each link in the network and the values of trust are any of a rating and a selection for inclusion or exclusion. The selection for inclusion or exclusion can include any of manufacturer of the network elements associated with each link in the network, country where the network elements are located in, and network operator of the network elements. The privacy quantifies a number of the links the network path is routed over for network obfuscation. The secrecy quantifies a level of encryption utilized on the links. The level of encryption utilized on the links can be quantified as a value between an unencrypted link up to a hardware encrypted link.

The multi-criteria path selection process 100 can further include providing a user interface that includes a plurality of slide bars for selection of any of the plurality of criteria, wherein the plurality of slide bars each include either a range or a threshold for the corresponding values (step 108). The user interface can also further include one or more check boxes for including or excluding the values from one or more of the plurality of criteria. The multi-criteria path selection process 100 can further include updating the network map to visually change any links in the network based on selections in the user interface, wherein non-compliant links are visually distinguished from compliant links based on the selections (step 110).

The plurality of criteria can further include any of latency, capacity, cost, jitter, and loss. The plurality of criteria can further include cost that equates to a value to operate and/or a value of equipment. The multi-criteria path selection process 100 can further include adding a new criterion to the plurality of criteria for use in the multi-criteria path selection process. The associated values can be one of assigned in advance, computed, and based on measurements in the network.

Processing Device

Figure 9:
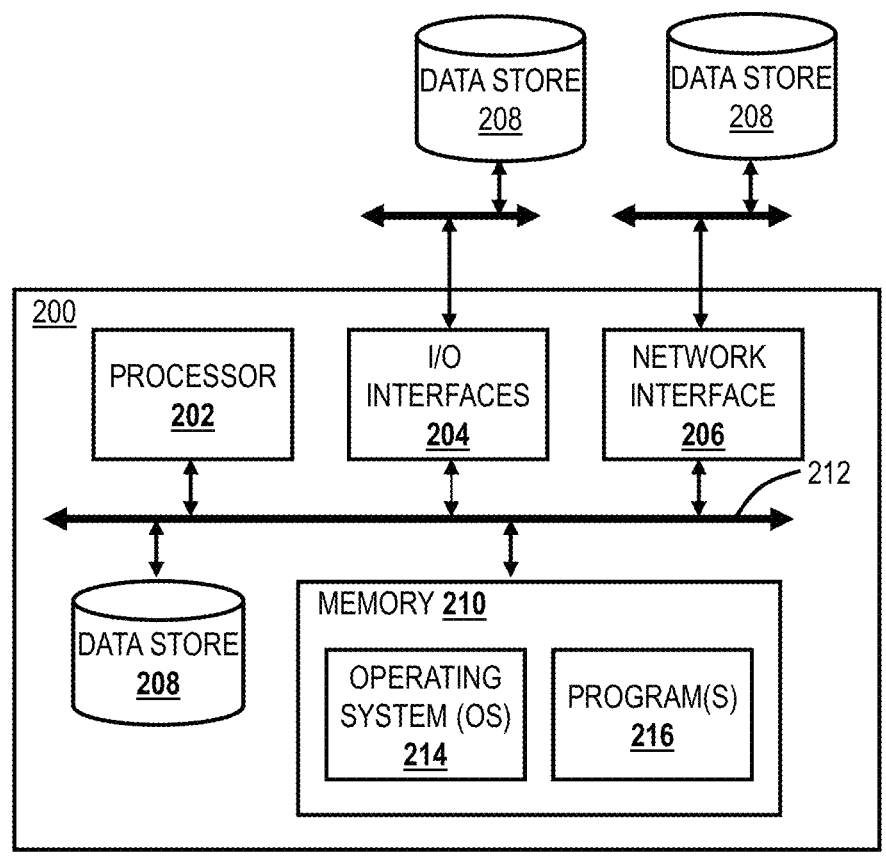
FIG. 9 is a block diagram of a processing device.

FIG. 9 is a block diagram of a processing device 200 for use herein. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 9 depicts the processing device 200 in an over-simplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200, such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

The processing device 200 can provide the GUI 30 to allow the operator to adjust the algorithm using the slide bars 34. The values set by the slide bars 34 determine the weights assigned to the criteria in the algorithm. By allowing a min and a max for certain criteria, the slide bars 34 allow the operator to specify a range of acceptable values. The levers at each level are exposed to an operator via a centralized decision engine. This engine then pushes instructions to the network to ensure that specific network circuits, links or flows follow the determined path. Using the SDN controller 18, forwarding information can be programmed into the network, either element by element or by use of a source-based routing protocol like Segment Routing.

Through the use of network "playback" feature, the system will be capable of tracking and logging the network state and the configuration of any network request that has previously been rendered. This will allow for historical tracking of network state and performance. For troubleshooting purposes or otherwise, the user will have the ability to select from a catalog of previous deployments and be able to simulate the network as it was deployed. The operator will then have the ability to replay traffic flows to validate performance and if the correct decisions were made or if their customer was exposed to external dependencies or threats that were not accounted for.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a processing device to perform steps of:
   providing a user interface that includes i) one or more slide bars for selection of a plurality of criteria and ii) one or more check boxes for including or excluding any of the plurality of criteria, wherein the one or more slide bars each include either a range or a threshold for the corresponding values;
   receiving a request for a path in a network including a plurality of network elements interconnected to one another via links, wherein the request includes values for the plurality of criteria, wherein the plurality of criteria include trust, privacy, and secrecy and one or more of latency, capacity, cost, loss, and reliability thresholds;
   utilizing a multi-criteria path selection process to determine the path through the plurality of network elements over the links based on the plurality of criteria and the associated values, wherein the path has values for the plurality of criteria that are within either the range or the thresholds for the included criteria where the included criteria have their check boxes selected; and
   providing a display of the determined path in a network map, wherein non-compliant links are visually distinguished from compliant links based on the selections.

2. The non-transitory computer-readable medium of claim 1, wherein the trust quantifies trustworthiness of each link in the network and the values of trust are any of a rating based on the trust and a selection for inclusion or exclusion based on the trust.

3. The non-transitory computer-readable medium of claim 2, wherein the selection for inclusion or exclusion includes any of manufacturer of the network elements associated with each link in the network, country where the network elements are located in, and network operator of the network elements.

4. The non-transitory computer-readable medium of claim 1, wherein the privacy quantifies a number of the links the network path is routed over for network obfuscation.

5. The non-transitory computer-readable medium of claim 1, wherein the secrecy quantifies a level of encryption utilized on the links.

6. The non-transitory computer-readable medium of claim 5, wherein the level of encryption utilized on the links is quantified as a value between an unencrypted link up to a hardware encrypted link.

7. The non-transitory computer-readable medium of claim 1, wherein the steps further include
   responsive to changes in any of the one or more check boxes and the one or more slide bars updating the network map to visually change any links in the network.

8. The non-transitory computer-readable medium of claim 1, wherein the plurality of criteria further includes cost that equates to a value to operate and/or a value of equipment.

9. The non-transitory computer-readable medium of claim 1, wherein the steps further include
   adding a new criterion to the plurality of criteria for use in the multi-criteria path selection process.

10. The non-transitory computer-readable medium of claim 1, wherein the associated values are one of assigned in advance, computed, and based on measurements in the network.

11. A method comprising:
    providing a user interface that includes i) one or more slide bars for selection of any of a plurality of criteria and ii) one or more check boxes for including or excluding any of the plurality of criteria, wherein the one or more slide bars each include either a range or a threshold for the corresponding values;
    receiving a request for a path in a network including a plurality of network elements interconnected to one another via links, wherein the request includes values for the plurality of criteria, wherein the plurality of criteria include trust, privacy, and secrecy and one or more of latency, capacity, cost, loss, and reliability thresholds;
    utilizing a multi-criteria path selection process to determine the path through the plurality of network elements over the links based on the plurality of criteria and the associated values, wherein the path has values for the plurality of criteria that are within either the range or the thresholds for the included criteria where the included criteria have their check boxes selected; and
    providing a display of the determined path in a network map, wherein non-compliant links are visually distinguished from compliant links based on the selections.

12. The method of claim 11, wherein the trust quantifies trustworthiness of each link in the network and the values of trust are any of a rating based on the trust and a selection for inclusion or exclusion based on the trust,
    wherein the privacy quantifies a number of the links the network path is routed over for network obfuscation, and
    wherein the secrecy quantifies a level of encryption utilized on the links.

13. The method of claim 11, further comprising
    updating the network map to visually change any links in the network based on selections in the user interface, wherein non-compliant links are visually distinguished from compliant links based on the selections.

14. A processing device comprising:
    one or more processors and memory comprising instructions that, when executed, cause the one or more processors to
    provide a user interface that includes i) one or more slide bars for selection of a plurality of criteria and ii) one or more check boxes for including or excluding any of the plurality of criteria, wherein the one or more slide bars each include either a range or a threshold for the corresponding values;
    receive a request for a path in a network including a plurality of network elements interconnected to one another via links, wherein the request includes values for a plurality of criteria, wherein the plurality of criteria include trust, privacy, and secrecy and one or more of latency, capacity, cost, loss, and reliability thresholds;

utilize a multi-criteria path selection process to determine the path through the plurality of network elements over the links based on the plurality of criteria and the associated values, wherein the path has values for the plurality of criteria that are within either the range or the thresholds for the included criteria where the included criteria have their check boxes selected; and provide a display of the determined path in a network map, wherein non-complaint links are visually distinguished from compliant links based on the selections.

15. The processing device of claim 14, wherein the trust quantifies trustworthiness of each link in the network and the values of trust are any of a rating based on the trust and a selection for inclusion or exclusion based on the trust, wherein the privacy quantifies a number of the links the network path is routed over for network obfuscation, and wherein the secrecy quantifies a level of encryption utilized on the links.

16. The processing device of claim 14, wherein the instructions that, when executed, further cause the one or more processors to responsive to changes in any of the one or more check boxes and the one or more slide bars, updating the network map to visually change any links in the network, wherein non-compliant links are visually distinguished from compliant links based on the selections.

17. The processing device of claim 16, wherein the non-compliant links do not meet one or more of the plurality of criteria.

18. The processing device of claim 16, wherein the non-compliant links are one of grayed out, different colors from the compliant links, and omitted.

* * * * *